United States Patent
Dooley et al.

(10) Patent No.: US 7,104,590 B2
(45) Date of Patent: Sep. 12, 2006

(54) VEHICLE TRIM PANEL WITH INTEGRAL NIBBED ARMREST

(75) Inventors: Dave Dooley, Troy, MI (US); Mark Loehr, Auburn Hills, MI (US)

(73) Assignee: Lear Corporation, Southfield, MI (US)

( * ) Notice: Subject to any disclaimer, the term of this patent is extended or adjusted under 35 U.S.C. 154(b) by 26 days.

(21) Appl. No.: 10/710,305

(22) Filed: Jul. 1, 2004

(65) Prior Publication Data

US 2006/0001291 A1 Jan. 5, 2006

(51) Int. Cl.
*B60N 2/46* (2006.01)

(52) U.S. Cl. .................. 296/153; 296/146.7; 296/1.09

(58) Field of Classification Search ............... 296/39.1, 296/153, 146.7, 1.09, 1.08
See application file for complete search history.

(56) References Cited

U.S. PATENT DOCUMENTS

| | | | |
|---|---|---|---|
| 3,400,979 A | 9/1968 | James | 297/412 |
| 4,456,644 A * | 6/1984 | Janz et al. | 428/158 |
| 4,667,979 A * | 5/1987 | Wolff | 280/752 |
| 4,780,345 A | 10/1988 | Gray | |
| 4,781,956 A | 11/1988 | Zimmerman et al. | 428/43 |
| 4,783,114 A | 11/1988 | Welch | 296/153 |
| 4,810,452 A | 3/1989 | Taillefert et al. | 264/247 |
| 4,882,842 A | 11/1989 | Basson et al. | 29/857 |
| 5,002,307 A | 3/1991 | Heidorn | 280/731 |
| 5,040,335 A | 8/1991 | Grimes | 49/502 |
| 5,048,234 A | 9/1991 | Lau et al. | 49/502 |
| 5,071,605 A | 12/1991 | Kawaguchi et al. | 264/45.2 |
| 5,073,318 A | 12/1991 | Rohrlach et al. | 264/46.5 |
| 5,178,807 A | 1/1993 | Thary | 264/46.4 |
| 5,181,759 A | 1/1993 | Doolittle | 296/153 |
| 5,224,299 A | 7/1993 | Abe | 49/502 |
| 5,297,842 A | 3/1994 | Hayashi | 296/147.6 |
| 5,387,390 A | 2/1995 | Kornylo | 264/46.8 |
| 5,395,135 A | 3/1995 | Lim et al. | 280/751 |
| 5,445,430 A | 8/1995 | Nichols | 296/153 |
| 5,468,433 A | 11/1995 | Perry et al. | 264/46.4 |
| 5,484,561 A | 1/1996 | Weber et al. | 264/46.4 |
| 5,527,084 A | 6/1996 | Scherf | 296/153 |
| 5,536,351 A | 7/1996 | Rheinlander et al. | 156/212 |
| 5,571,597 A | 11/1996 | Gallagher et al. | 428/152 |
| 5,573,617 A | 11/1996 | Franck et al. | 156/196 |

(Continued)

FOREIGN PATENT DOCUMENTS

EP 1182024 2/2002

(Continued)

OTHER PUBLICATIONS

Steven R. Sopher, *Advancements in Soft Polyolefin Bead Foams for Automotive Interior Trim Components*, Brochure, 2004, 10 pgs.

(Continued)

*Primary Examiner*—Dennis H. Pedder
(74) *Attorney, Agent, or Firm*—Wood, Herron & Evans, L.L.P.

(57) ABSTRACT

A door trim panel for a door frame of a motor vehicle. The door trim panel includes a main body portion adapted to be removably secured to the door frame and a bolster removably secured to the main body portion. The bolster covers an access opening defined in the main body portion. Fastened to the bolster is an armrest that includes a plurality of spaced-apart nibs or projections positioned to contact an integral support surface of the bolster to thereby support the armrest. In certain embodiments of the invention, the bolster may be integral with the main body portion.

4 Claims, 3 Drawing Sheets

U.S. PATENT DOCUMENTS

| | | | |
|---|---|---|---|
| 5,590,901 A | 1/1997 | MacGregor | 280/728.3 |
| 5,626,382 A | 5/1997 | Johnson et al. | 296/146.7 |
| 5,663,210 A | 9/1997 | Sugimoto et al. | 521/81 |
| 5,692,711 A | 12/1997 | Tucker | 248/118 |
| 5,695,870 A | 12/1997 | Kelch et al. | 428/318.4 |
| 5,709,925 A | 1/1998 | Spengler et al. | 428/198 |
| 5,738,810 A | 4/1998 | De Filippo | 264/46.7 |
| 5,816,609 A | 6/1998 | Gray et al. | 280/728.3 |
| 5,792,413 A | 8/1998 | Ang et al. | 264/515 |
| 5,799,385 A | 9/1998 | Vecchiarino et al. | 29/469 |
| 5,803,415 A | 9/1998 | Konishi et al. | |
| 5,810,388 A | 9/1998 | Berardi et al. | 280/728.3 |
| 5,837,172 A | 11/1998 | Pritchard et al. | |
| 5,884,434 A | 3/1999 | Dedrich et al. | 49/503 |
| 5,951,094 A | 9/1999 | Konishi et al. | |
| 5,952,630 A | 9/1999 | Filion et al. | 200/5 R |
| 5,967,594 A | 10/1999 | Ramanujam | 296/153 |
| 5,976,289 A | 11/1999 | Kawakubo et al. | 156/78 |
| 5,995,380 A | 11/1999 | Maue et al. | 361/826 |
| 6,012,735 A | 1/2000 | Gray et al. | 280/728.2 |
| 6,013,210 A | 1/2000 | Gardner, Jr. | 264/40.1 |
| 6,017,617 A | 1/2000 | Gardner, Jr. | 428/309.9 |
| 6,070,905 A | 6/2000 | Renault | 280/751 |
| 6,123,385 A | 9/2000 | Bailey et al. | 296/146.7 |
| 6,136,415 A | 10/2000 | Spengler | 428/157 |
| 6,168,188 B1 | 1/2001 | Preisler et al. | 280/728.3 |
| 6,185,872 B1 | 2/2001 | Seeberger et al. | 49/502 |
| 6,186,582 B1 | 2/2001 | Beckmann | 296/189 |
| 6,210,613 B1 | 4/2001 | Stein et al. | 264/45.4 |
| 6,214,157 B1 | 4/2001 | Spengler | 156/304.6 |
| 6,217,098 B1 | 4/2001 | O'Brien et al. | 296/70 |
| 6,238,507 B1 | 5/2001 | Jones et al. | 156/224 |
| 6,248,200 B1 | 6/2001 | Dailey et al. | 156/245 |
| 6,251,326 B1 | 6/2001 | Siano et al. | 264/328.8 |
| 6,308,488 B1 | 10/2001 | Hoshino | 52/716.5 |
| 6,316,415 B1 | 11/2001 | Albrecht et al. | 514/18 |
| 6,319,438 B1 | 11/2001 | Smith et al. | 264/75 |
| 6,325,410 B1 | 12/2001 | Eyrainer | |
| 6,358,599 B1 | 3/2002 | Deibel et al. | 428/308.4 |
| 6,364,351 B1 | 4/2002 | Hier et al. | 280/732 |
| 6,368,093 B1 | 4/2002 | Vecchiarino et al. | 425/130 |
| 6,381,906 B1 | 5/2002 | Pacella et al. | 49/502 |
| 6,391,232 B1 | 5/2002 | Fritsch | |
| 6,433,728 B1 | 8/2002 | Krupp et al. | 341/176 |
| 6,440,514 B1 | 8/2002 | Ueno et al. | 438/43 |
| 6,447,047 B1 | 9/2002 | Marcovecchio et al. | |
| 6,453,535 B1 | 9/2002 | Nicholas | 29/413 |
| 6,544,449 B1 | 4/2003 | Gardner | 264/46.5 |
| 6,568,707 B1 | 5/2003 | Hier et al. | 280/732 |
| 6,652,793 B1 | 11/2003 | Corrion et al. | 264/242 |
| 6,688,640 B1 | 2/2004 | Davis, Jr. et al. | 280/728.3 |
| 6,708,462 B1 | 3/2004 | Pokorzynski et al. | 52/716.5 |
| 6,742,830 B1 | 6/2004 | Zimmerman et al. | 296/146.7 |
| 6,756,004 B1 | 6/2004 | Davis, Jr. et al. | 264/255 |
| 6,764,633 B1 | 7/2004 | Takahashi et al. | 264/259 |
| 6,793,181 B1 | 9/2004 | Hallock | 244/129.1 |
| 6,821,465 B1 | 11/2004 | Stein et al. | |
| 6,837,544 B1 | 1/2005 | Bornchen et al. | 297/411.21 |
| 6,872,673 B1 | 3/2005 | MacAulay | 442/152 |
| 6,893,077 B1 * | 5/2005 | DeJongh | 296/187.05 |
| 6,899,363 B1 | 5/2005 | Dry | 296/1.09 |
| 6,899,373 B1 | 5/2005 | Kim | 296/146.7 |
| 6,929,309 B1 | 8/2005 | Radu et al. | 296/146.7 |
| 6,955,392 B1 | 10/2005 | Dry | 296/146.7 |
| 6,983,967 B1 | 1/2006 | Scheidmantal et al. | 296/1.09 |
| 6,991,841 B1 | 1/2006 | Cowelchuk et al. | 428/71 |
| 2001/0047899 A1 | 12/2001 | Ikeda | |
| 2002/0043861 A1 | 4/2002 | Meadows | |
| 2002/0066972 A1 | 6/2002 | Fritsch | |
| 2002/0125734 A1 | 9/2002 | Pokorzynski et al. | 296/146.7 |
| 2002/0153741 A1 | 10/2002 | Speelman et al. | |
| 2003/0041955 A1 | 3/2003 | Spengler | |
| 2003/0184064 A1 | 10/2003 | Hier et al. | |
| 2003/0209888 A1 | 11/2003 | Davis, Jr. et al. | |
| 2003/0209892 A1 | 11/2003 | Hier et al. | |
| 2004/0119267 A1 | 6/2004 | Cowelchuck et al. | |
| 2004/0119268 A1 | 6/2004 | Davis, Jr. et al. | |
| 2005/0023861 A1 | 2/2005 | Hirotani et al. | |
| 2005/0200161 A1 * | 9/2005 | Reed et al. | 296/153 |

FOREIGN PATENT DOCUMENTS

| | | |
|---|---|---|
| EP | 1580077 | 9/2005 |
| FR | 2796610 | 1/2001 |
| JP | 8011145 | 1/1996 |
| JP | 08183059 | 7/1996 |
| JP | 2000-264361 | 9/2000 |
| JP | 2003103676 | 4/2003 |

OTHER PUBLICATIONS

Mekas et al., U.S. Appl. No. 10/708,315, filed Feb. 24, 2004.
Cowelchuk et al., U.S. Appl. No. 10/708,500, filed Mar. 8, 2004.
Schoemann et al., U.S. Appl. No. 10/709,382, filed Apr. 30, 2004.
Cowelchuk et al., U.S. Appl. No. 10/904,008, filed Oct. 19, 2004.
Cowelchuk et al., U.S. Appl. No. 10/904,010, filed Oct. 19, 2004.
Alan G. Dry, U.S. Appl. No. 10/905,566, filed Jan. 11, 2005.
Chevalier, Alicia Ann (Examiner), U.S. Patent and Trademark Office, Office Action mailed Nov. 15, 2005, related U.S. Appl. No. 10/708,315.
Pedder, Dennis H. (Examiner), U.S. Patent and Trademark Office, Office Action mailed Jun. 1, 2005, related U.S. Appl. No. 10/708,500.
Pedder, Dennis H. (Examiner), U.S. Patent and Trademark Office, Office Action mailed Oct. 3, 2005, related U.S. Appl. No. 10/708,500.
Patel, Kiran B. (Examiner), U.S. Patent and Trademark Office, Office Action mailed Jun. 16, 2005, related U.S. Appl. No. 10/709,382.
Patel, Kiran B. (Examiner), U.S. Patent and Trademark Office, Office Action mailed Oct. 13, 2005, related U.S. Appl. No. 10/709,382.
Pedder, Dennis H. (Examiner), U.S. Patent and Trademark Office, Notice of Allowance and Fee(s) Due mailed Jan. 18, 2006, related U.S. Appl. No. 10/708,500.
Chevalier, Alicia Ann (Examiner), U.S. Patent and Trademark Office, Office Action mailed Apr. 18, 2006, related U.S. Appl. No. 10/708,315.
Blankenship, Gregory A. (Examiner), U.S. Patent and Trademark Office, Office Action mailed Mar. 1, 2006, related U.S. Appl. No. 10/904,010.
Pedder, Dennis H. (Examiner), U.S. Patent and Trademark Office, Supplemental Notice of Allowability mailed Mar. 2, 2006, related U.S. Appl. No. 10/708,500.
Patel, Kiran B. (Examiner), U.S. Patent and Trademark Office, Office Action mailed Mar. 27, 2006, related U.S. Appl. No. 10/709,382.
DePue, United States Patent Application Publication No. 2005/0183897, Publication Date: Aug. 25, 2005.
Cowelchok et al., United States Patent Application Publication No. 2004/0130051, Publication Date: Jul. 8, 2004.
The UK Patent Office, Search Report issued in GB 0521012.5, Dated: Nov. 18, 2005 (1 page).
The UK Patent Office, Search Report Issued in Application No. GB0520995.2, Dated: Dec. 22, 2005 (1 page).

* cited by examiner

VEHICLE TRIM PANEL WITH INTEGRAL NIBBED ARMREST

CROSS-REFERENCE TO RELATED APPLICATIONS

This application is related to U.S. patent application Ser. No. 10/708,315 filed Feb. 24, 2004, now pending in the U.S. Patent and Trademark Office and U.S. patent application Ser. No. 10/708,500 filed Mar. 8, 2004, now pending in the U.S. Patent and Trademark Office and U.S. patent application Ser. No. 10/709,382 filed Apr. 30, 2004, now pending in the U.S. Patent and Trademark Office and U.S. patent application Ser. No. 10/904,008 filed Oct. 19, 2004, now pending in the U.S. Patent and Trademark Office and U.S. patent application Ser. No. 10/904,010 filed Oct. 19, 2004, now pending in the U.S. Patent and Trademark Office and U.S. patent application Ser. No. 10/905,566 filed Jan. 11, 2005, now pending in the U.S. Patent and Trademark Office.

FIELD OF THE INVENTION

The invention relates generally to vehicle doors, and more particularly to trim panels for vehicle doors.

BACKGROUND OF THE INVENTION

Vehicle door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing facade viewed by occupants seated in the passenger cabin of the motor vehicle. Typically disposed between the inner sheet metal panel and trim panel is a water and/or sound barrier that closes the various openings and prevents water infiltrating the interior of the door from wetting the interior surface of the trim panel. A wire harness communicates electrical connections between mechanisms attached to the vehicle door and controls on the trim panel. The latch is connected by a cable to an inner release handle accessible to the vehicle occupant.

Door trim panels have previously been constructed as assemblies in which the individual components are assembled together and attached to a panel by several different conventional processes including adhesives, heat staking, sonic welding, fasteners, etc. Such assemblies may include a nibbed armrest sub-assembly consisting of an injection molded skin that is assembled with a substrate. The nibbed armrest and substrate sub-assembly is then directly attached to the trim panel or attached to a removable bolster covering an access opening in the trim panel. While such conventional assemblies may provide a desired appearance and functionality, the use of such conventional assemblies introduce their own drawbacks. For instance, the use of a separate substrate to reinforce and support the nibbed armrest introduces a separate component in the assembly and also increases cost.

What is needed therefore is a door trim panel construction that addresses these and other deficiencies of conventional door trim panel constructions.

SUMMARY OF INVENTION

The invention provides a door trim panel construction including a main body portion adapted to be removably secured to a door frame of a motor vehicle and an armrest fastened to the main body portion. The main body portion includes an integral support surface and the armrest includes a plurality of spaced-apart nibs or projections positioned to contact the integral support surface to thereby support the armrest. The integration of the nibbed armrest with the main body portion of the trim panel eliminates the cost of an add-on armrest assembly.

In another embodiment of the invention, a door trim panel includes a main body portion adapted to be removably secured to a door frame of a motor vehicle and a bolster removably secured to the main body portion. The bolster covers an access opening defined in the main body portion and includes an integral support surface. Fastened to the bolster is an armrest that includes a plurality of spaced-apart nibs or projections positioned to contact the integral support surface to thereby support the armrest. The integration of the nibbed armrest with the bolster of the trim panel eliminates the cost of an add-on armrest assembly.

In another aspect, a method of making a door trim panel for mounting to a door frame of a motor vehicle includes molding a bolster with an integral support surface and mounting an armrest to the door trim panel. The armrest is mounted to the door trim panel such that a plurality of projections projecting from the armrest are in contact with the integral support surface.

These and other objects and advantages of the invention shall become more apparent from the accompanying drawings and description thereof.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
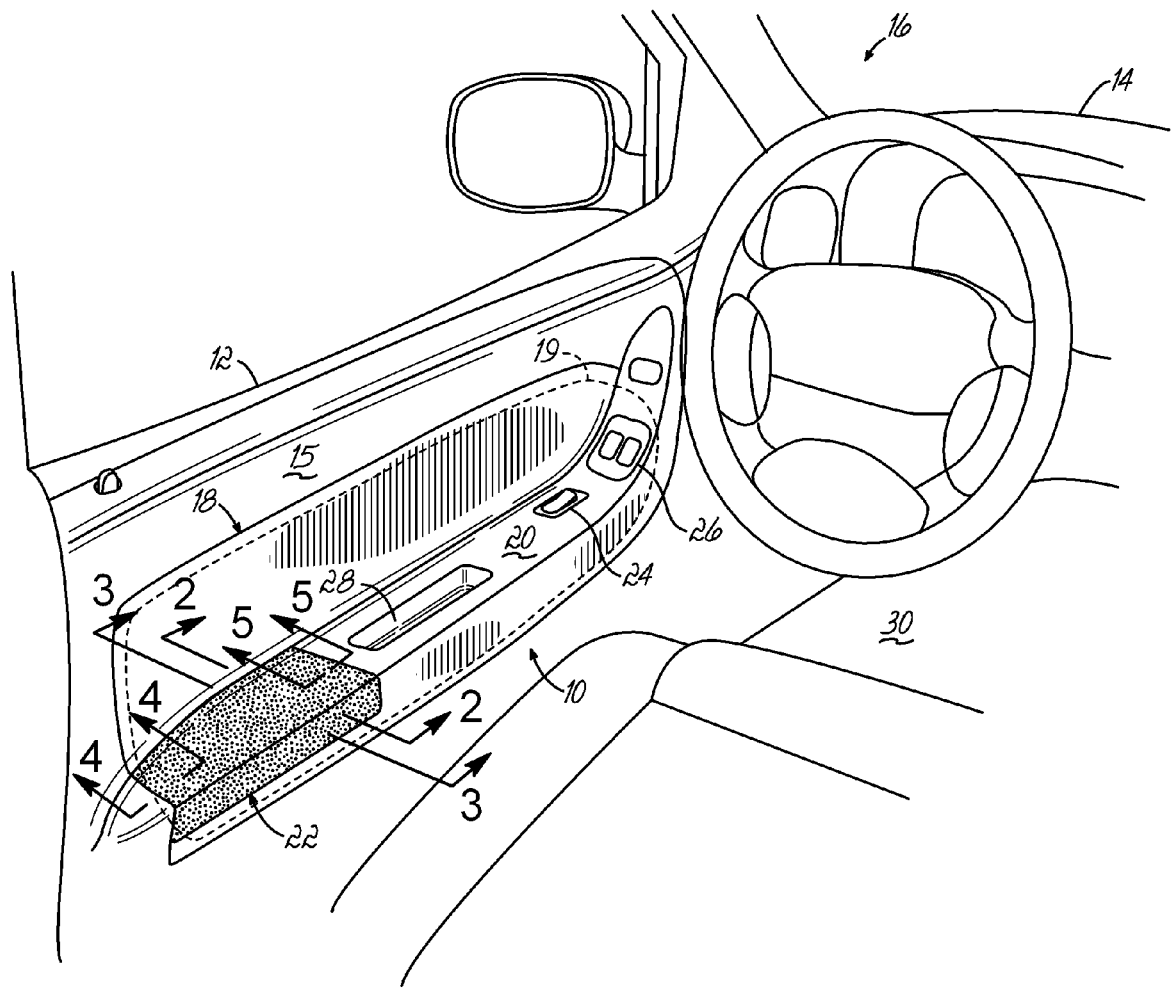
FIG. 1 is a perspective view of a door trim panel fastened to a vehicle door frame and constructed in accordance with the invention.

With reference to FIG. 1, a door trim panel 10 constructed in accordance with an embodiment of the invention is shown fastened to a door of a vehicle such as, for example, an automobile, a truck, or an aircraft. More specifically, door trim panel 10 is a coupled as an assembly with, and inboard of, the inner sheet metal of a door frame 12, which has a hinged attachment with a body 14 of an automobile 16. However, persons of ordinary skill in the art will appreciate that door trim panel 10 may be used on other doors including but not limited to sliding doors, hatches, etc. Further, persons of ordinary skill in the art will also appreciate that door frame 12 may be constructed of other materials such as composites like fiberglass and carbon fibers. As used in this description, the terms such as "outboard," "outer" and "outward" indicate a direction or orientation away from or farther from a longitudinal centerline of the automobile 16. Conversely, "inboard," "inner" and "inward" indicate a direction or orientation toward or closer to the longitudinal centerline.

The door trim panel 10 includes a main body portion 15 coupled by fasteners with the door frame 12, a bolster 18 covering an access opening 19 defined in the main body portion 15, a switch bezel 20 supported by and secured to the bolster 18 in any suitable manner, such as by an interference fit or suitable fasteners, and an armrest 22 that is also supported by and secured to the bolster 18. Electrical control panels 24, 26 in switch bezel 20 carry control switches that are electrically coupled by a hidden wiring harness with conventional electrically-operated components such as door locks, window controls, seat controls, and side mirrors of the automobile 16. The switch bezel 20 includes a pull cup 28 that permits a passenger occupying passenger cabin 30 of automobile 16 to manually move the assembled door relative to the body 14 for passenger ingress and egress of the passenger cabin 30. An inner door release handle (not shown) for operating a door latch (not shown) is also accessible to a passenger inside the passenger cabin 30. An assembly line worker or service technician may access door components, such as an audio speaker, window regulator rails, a window motor, etc., mounted to the door frame 12 by removing the bolster 18 from the access opening 19.

The bolster 18 may be back-loaded into a hidden access opening in the main body portion 15, front-loaded into the access opening, or integral with the main body portion 15. The armrest 22 is typically front loaded to trim panel 15 so that the side edges of the armrest 22 are not visible to a passenger occupying passenger cabin 30. The arm rest 22 is typically molded from a thermoplastic or thermosetting polymer resin, such as polyvinyl chloride (PVC) or polyetherester (TPE), that has sufficient flexibility in the as-molded condition to temporarily contort without permanent distortion or warpage for assembly with bolster 18 and that may be molded as a die-locked part. On the other hand, the bolster 18 may be molded as a separate part without die-locked conditions requiring the use of expensive slide or lift actions for part ejection, which significantly reduces mold cost and contrasts with the molding of conventional bolsters having a support for an armrest.

Figure 2:
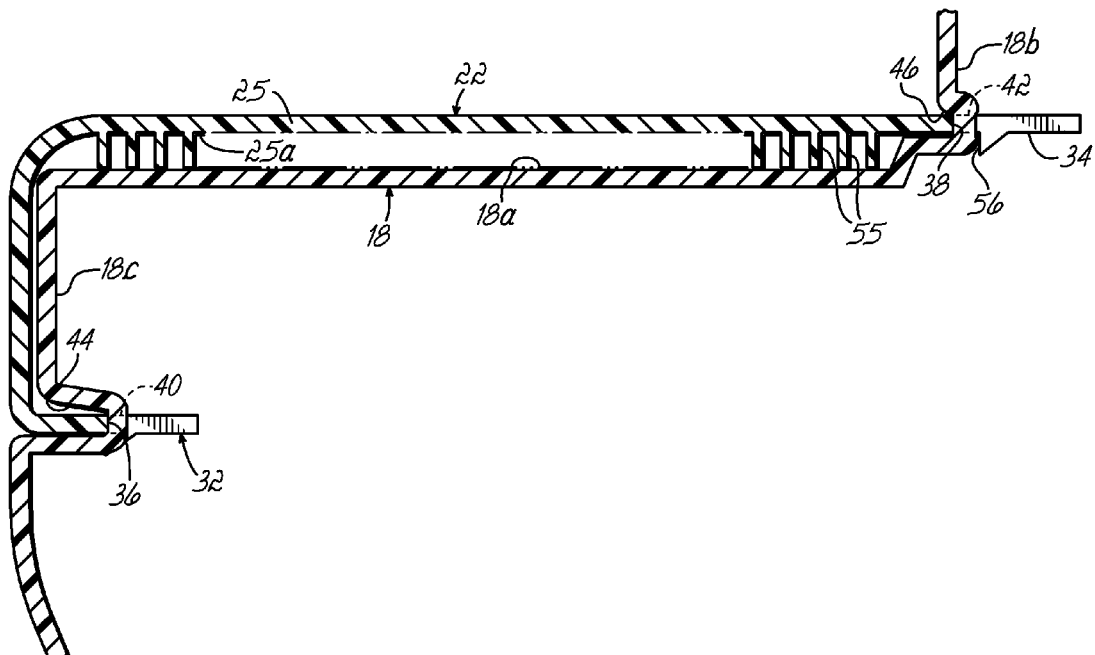
FIG. 2 is a cross-sectional view taken generally along line 2—2 of FIG. 1.
Figure 3:
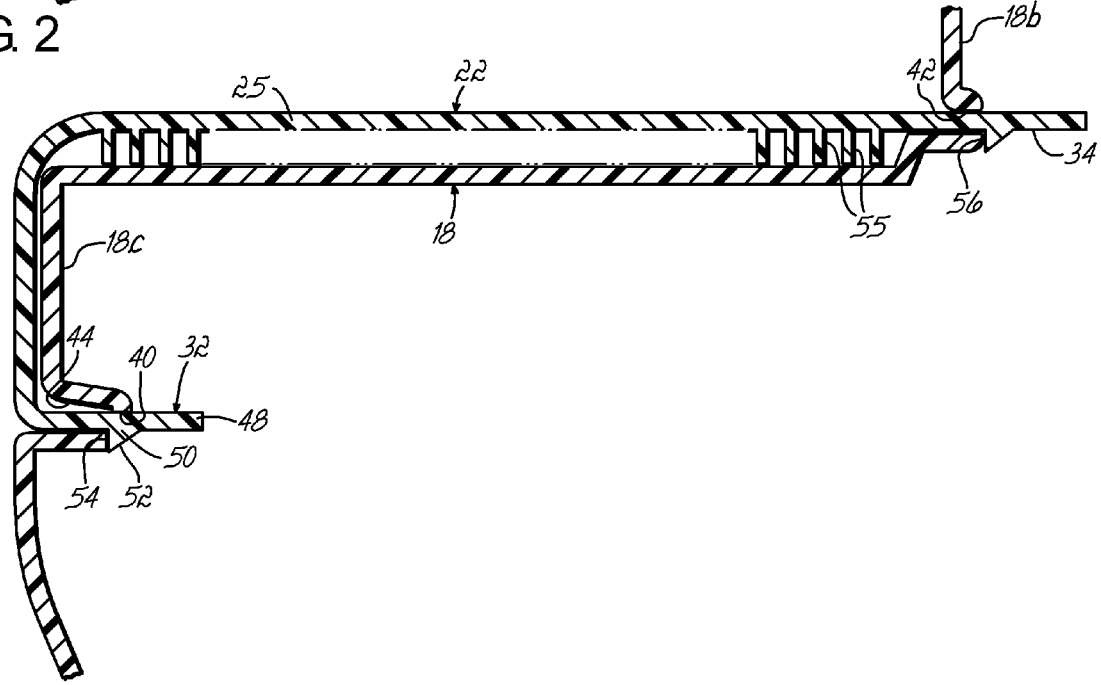
FIG. 3 is a cross-sectional view taken generally along line 3—3 of FIG. 1.

With reference to FIGS. 2 and 3 in which like reference numerals refer to like features in FIG. 1, the armrest 22 includes a contoured thin-walled shell 25 and plurality of spaced-apart detents or locking tabs 32 and 34 project from opposed side edges 36 and 38 of shell 25. The armrest 22 is secured to the bolster 18 by the snap-fit engagement of locking tabs 32 and 34 in a corresponding plurality of spaced-apart tab openings 40 and 42, respectively. The tab openings 40 and 42 penetrate through a corresponding one of U-shaped channels 44 and 46 extending along opposite side edges of the bolster 18. Each tab opening 40 and 42 is positioned on the bolster 18 to be registered with the location of one of the locking tabs 32 and 34, respectively, during installation of the bolster 18. Although the number of locking tabs 32 and the number of locking tabs 34 are contingent upon the design, the armrest 22 includes a minimum of one locking tab 32 and one locking tab 34 so that both side edges 36 and 38 are secured.

Because the locking tabs 32 are identical to locking tabs 34, the following description of locking tab 32 pertains equally to locking tab 34. Each locking tab 32 includes a free end 48 that protrudes through the tab opening 40 and a wedge-shaped section 50 with an inclined surface 52. A vertical retention edge 54 of the wedge-shaped section 50 is captured after assembly by a portion of the bolster 18 surrounding the tab opening 40. The contact between the vertical retention edge 54 and the bolster 18 prevents movement of the armrest 22 inward into the passenger cabin 30. For example, the engagement between the locking tabs 32, 34 and tab openings 40, 42 is adequate to secure the armrest 22 with the bolster 18 to resist a force applied by a passenger in the passenger cabin 30 to pull cup 28 for moving the assembled door relative to the body 14.

Extending vertically away from an inner surface 25a of shell 25 is a plurality of spaced-apart nibs or projections 55. A lower surface of each projection 55 contacts a confronting substrate surface 18a of the bolster 18. Substrate surface 18a projects generally perpendicular or inboard laterally between spaced-apart generally vertical surfaces 18b and 18c of the bolster 18. Substrate surface 18a may be oriented generally horizontally or, alternatively, may be inclined from the horizontal along the longitudinal axis of the automobile 16. The substrate surface 18a may be substantially flat or may be partially or completely concave or convex.

The projections 55 separate the armrest 22 from the bolster 18 and serve to supply a cushioning effect to, and support the load of, a passenger's arm resting on the armrest 22. The height of the projections 55 is design specific. The substrate surface 18a is integral with the bolster 18 and yet serves the support function for armrest 22, which represents an improvement over conventional armrest designs that require a separate add-on component subassembly consisting of an armrest and a substrate. The substrate support surface 18a is unitary and forms a single piece with the vertical surfaces 18b and 18c of the bolster 18.

Regions of side edges 54 and 56 located between locking tabs 32 and 34, respectively, are featureless and are received inside a corresponding one of channels 40 and 42, respectively. The channels 40 and 42 conceal the side edges 54 and 56 from the view of a passenger in the passenger cabin 30.

Figure 4:
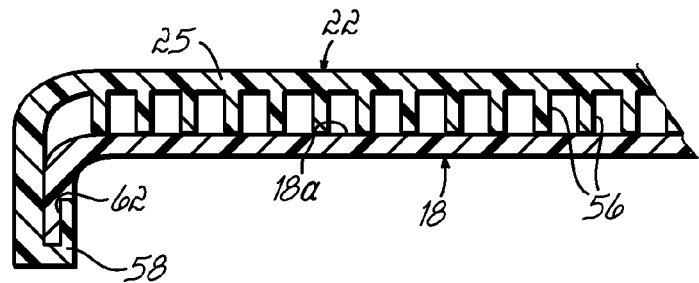
FIG. 4 is a cross-sectional view taken generally along line 4—4 of FIG. 1.
Figure 5:
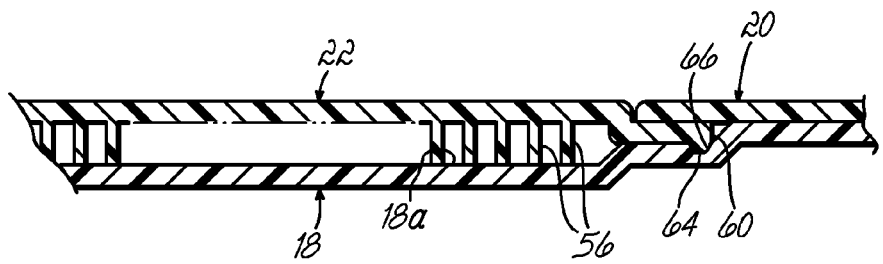
FIG. 5 is a cross-sectional view taken generally along line 5—5 of FIG. 1.

With reference to FIGS. 4 and 5 in which like reference numerals refer to like features in FIGS. 2 and 3, the shell 52 of armrest 22 includes end edges 58 (FIG. 4) and 60 (FIG. 5) extending between the side edges 54 and 56. As shown in FIG. 4, side edge 58 includes a channel 62 that receives the nearby edge of the bolster 18 to provide a smooth and finished appearance. As shown in FIG. 5, side edge 60 includes a ridge 64 received in a locking manner within a channel 66 formed in the bolster 18. The side edge 60 is captured between the bolster 18 and the switch bezel 20, which constrains the side edge 60 against movement. The armrest 22 is secured to bolster 18 before the switch bezel is added to the assembly. However, the invention is not so limited as the side edge 60 of shell 25 may be secured with bolster 18 in any conventional manner.

Figure 7:
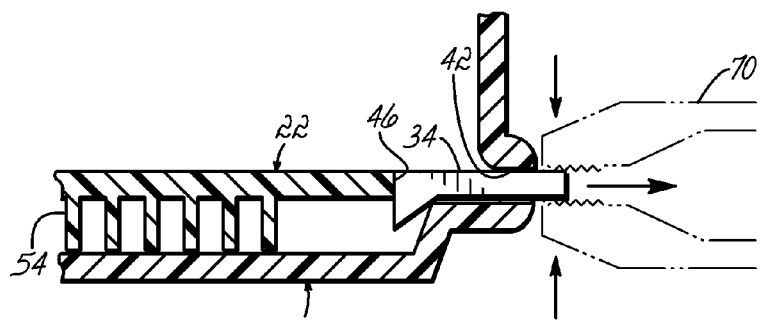
FIG. 7 is a detailed view similar to a portion of FIG. 6 showing a further step in the assembly procedure of the arm rest with the bolster.
Figure 6:
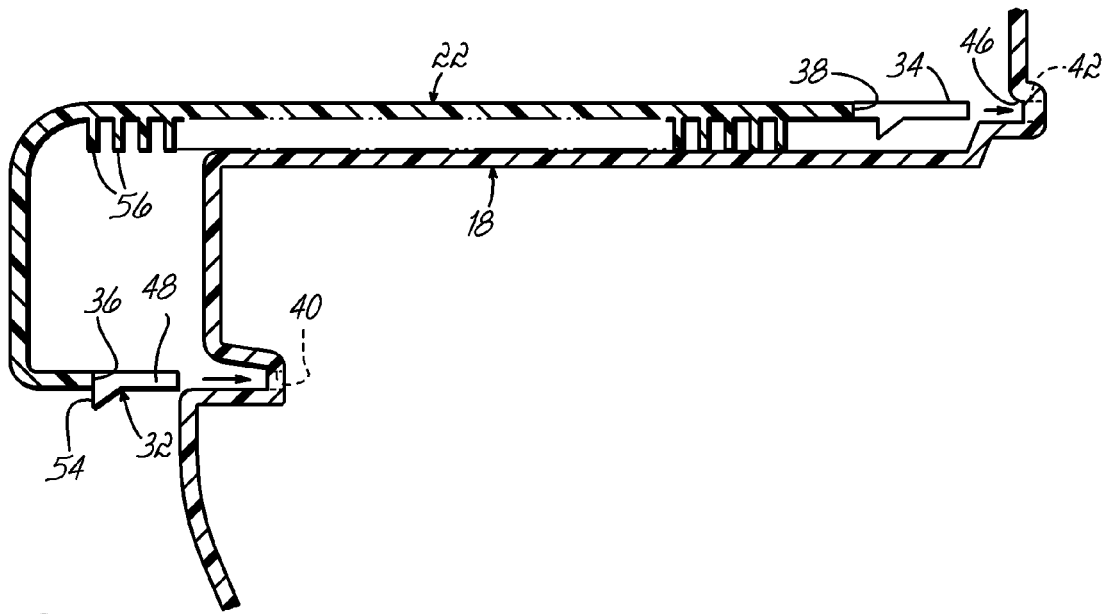
FIG. 6 is a cross-sectional view similar to FIG. 2 showing assembly of the armrest with the bolster of the door trim panel.

With reference to FIGS. 6 and 7 in which like reference numerals refer to like features in FIG. 2, the armrest 22 is assembled with the bolster 18 before the bolster 18 is mounted to the member 15 to form the trim panel 10. First, the ridge 64 of side edge 60 is positioned in channel 66. Then, the free end 48 of each of locking tabs 32 and 34 are inserted into a corresponding one of the tab openings 40 and 42, respectively. A tool 70 is engaged with the free end 48 of one or more of locking tabs 32 and/or locking tabs 34 and applies a force that pulls the locking tabs 32 and 34 through the corresponding tab openings 40 and 42. The material of locking tabs 32 and 34 compresses and/or the inclined surface 52 of the wedge-shaped section 50 resiliently deflects the material of the main body portion 15 surrounding openings 40 and 42. After the wedge-shaped section 50 emerges, the main body portion 15 and locking tabs 32 and 34 return to their original shape and the edge 54 of each of the locking tabs 32 and 34 is captured by a portion of the bolster 18 surrounding a corresponding one of the tab openings 40 and 42, respectively.

In alternative embodiments of the invention, the bolster 18 may be made integral with the main body portion 15 if an access opening 19 is not required for accessing door components. For example, such door assemblies are permitted if the trim panel 10 is removable as a unit from the door frame 12 and, when removed, reveals the door components. Such door assemblies are disclosed in commonly-owned and co-pending U.S. application Ser. No. 10/709,544, which is hereby incorporated by reference herein in its entirety.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A door trim panel for attachment to a door frame of a motor vehicle, comprising:

a main body portion adapted to be removably secured to the door frame, said main body portion including a support surface and a plurality of tab openings in said support surface; and an armrest fastened to said main body portion, said armrest including first and second side edges, a surface between said first and second side edges, a plurality of spaced-apart projections projecting from said surface to contact said support surface of said main body portion to thereby support said armrest, and a plurality of spaced-apart locking tabs projecting from said first and second side edges and engaged with said plurality of tab openings.

2. The door trim panel of claim 1 wherein each of said plurality of spaced-apart locking tabs includes a wedge-shaped body adapted to engage said main body portion about a corresponding one of said tab openings.

3. A door trim panel for attachment to a door frame of a motor vehicle, comprising:

a main body portion adapted to be removably secured to the door frame, said main body portion including an access opening;

a bolster removably secured to said main body portion, said bolster covering said access opening, and said bolster including a support surface and a plurality of tab openings in said support surface; and an armrest fastened to said bolster, said armrest including first and second side edges, a surface between said first and second side edges, a plurality of spaced-apart projections projecting from said surface to contact said support surface of said main body portion to thereby support said armrest, and a plurality of spaced-apart locking tabs projecting from said first and second side edges and engaged with said plurality of tab openings.

4. The door trim panel of claim 3 wherein each of said plurality of spaced-apart locking tabs includes a wedge-shaped body adapted to engage said main body portion about a corresponding one of said tab openings.

* * * * *